US011286628B2

(12) United States Patent
Drumm

(10) Patent No.: US 11,286,628 B2
(45) Date of Patent: Mar. 29, 2022

(54) EARTH WORKING MACHINE HAVING A DUST EXTRACTION SYSTEM AND ROTATABLE FILTER CARTRIDGES

(71) Applicant: Wirtgen GmbH, Windhagen (DE)

(72) Inventor: Stephan Drumm, Vettelschoß (DE)

(73) Assignee: Wirtgen GmbH

( * ) Notice: Subject to any disclaimer, the term of this patent is extended or adjusted under 35 U.S.C. 154(b) by 0 days.

(21) Appl. No.: 16/952,295

(22) Filed: Nov. 19, 2020

(65) Prior Publication Data

US 2021/0164175 A1     Jun. 3, 2021

(30) Foreign Application Priority Data

Dec. 3, 2019   (DE) ...................... 10 2019 132 886.1

(51) Int. Cl.
*E01C 23/088*     (2006.01)
*E01C 23/12*     (2006.01)
(Continued)

(52) U.S. Cl.
CPC .......... *E01C 23/088* (2013.01); *E01C 23/127* (2013.01); *B01D 46/103* (2013.01);
(Continued)

(58) Field of Classification Search
CPC .. E01C 2301/50; E01C 23/088; E01C 23/127; E21C 35/223; B01D 29/0075;
(Continued)

(56) References Cited

U.S. PATENT DOCUMENTS 3,395,517 A * 8/1968 Lang .................. B01D 46/4272
55/285
4,514,193 A * 4/1985 Booth .................... B01D 45/16
55/290
(Continued)

FOREIGN PATENT DOCUMENTS

DE           10223819 A1    12/2003
DE       102004007716 B3     6/2005

OTHER PUBLICATIONS

European Patent Office Search Report of corresponding patent No. EP 20211020.1, dated May 10, 2021, 6 pages.
(Continued)

*Primary Examiner* — Janine M Kreck
*Assistant Examiner* — Michael A Goodwin
(74) *Attorney, Agent, or Firm* — Lucian Wayne Beavers; Patterson Intellectual Property Law, PC

(57) ABSTRACT

A mobile earth working machine (10), for example a road milling machine, recycler, or surface miner, includes:
    a working apparatus (12) for material-removing working of a region of a substrate (U); and
    an extraction device (40) that is embodied to extract dust-laden air from at least one machine region at at least one extraction location (46), and to exhaust extracted air at a discharge location (50) different from the extraction location (46),
the extraction device (40) comprising a filter apparatus (42) arranged along an operational flow path from the at least one extraction location (46) to the discharge location (50), the filter apparatus (42) encompassing:
    a filter housing (54);
    a filter element (52) received in the filter housing (54), the filter element (52) being embodied to remove dust particles from the air flowing through the filter apparatus (42); and
(Continued)

a cleaning apparatus (76) that is embodied to remove from the filter element (52) dust particles that accumulate on the filter element (52) during filtering operation. Provision is made that the filter element (52) is received in the filter housing (54) rotatably around a rotation axis (D), the filter apparatus (42) comprising a rotary drive system (70) that is embodied to impart rotation to the filter element (50).

26 Claims, 6 Drawing Sheets

(51) Int. Cl.
*E21C 35/22* (2006.01)
*B01D 46/10* (2006.01)
*E01C 23/09* (2006.01)

(52) U.S. Cl.
CPC ...... *E01C 23/0933* (2013.01); *E01C 2301/50* (2013.01); *E21C 35/223* (2013.01)

(58) Field of Classification Search
CPC ............ B01D 29/0077; B01D 29/0079; B01D 29/0084; B01D 35/308; B01D 25/32; B01D 25/325; B01D 25/34; B01D 35/16; B01D 35/30; B01D 46/02; B01D 46/04; B01D 46/06; B01D 46/08; B01D 46/24; B01D 46/26; B01D 46/2411; B01D 46/103; B08B 15/02
See application file for complete search history.

(56) References Cited

U.S. PATENT DOCUMENTS

| | | | |
|---|---|---|---|
| 4,661,129 A * | 4/1987 | Nederman | B01D 46/521 96/408 |
| 5,673,974 A * | 10/1997 | Lammer | E21C 35/223 299/12 |
| 7,175,364 B2 | 2/2007 | Gaertner et al. | |
| 7,219,964 B2 | 5/2007 | Berning et al. | |
| 8,220,875 B2 | 7/2012 | Cipriani | |
| 2005/0179309 A1* | 8/2005 | Berning | B28D 7/02 299/39.2 |
| 2010/0327651 A1* | 12/2010 | Cipriani | E01C 23/088 299/39.2 |
| 2015/0104255 A1* | 4/2015 | Musil | E01C 23/088 404/76 |
| 2016/0326870 A1* | 11/2016 | Bjorge | E21C 35/223 |
| 2018/0140988 A1* | 5/2018 | Frese | B01D 46/0065 |
| 2019/0009281 A1* | 1/2019 | Kraxner | B01D 46/0065 |
| 2019/0048535 A1 | 2/2019 | O'Connor et al. | |
| 2019/0257042 A1* | 8/2019 | Laux | E01C 23/088 |
| 2019/0388808 A1* | 12/2019 | Takahashi | B01D 46/0065 |

OTHER PUBLICATIONS

Co Pending U.S. Appl. No. 16/952,282, filed Nov. 19, 2020 (not prior art).
Co Pending U.S. Appl. No. 16/952,289, filed Nov. 19, 2020 (not prior art).

* cited by examiner

EARTH WORKING MACHINE HAVING A DUST EXTRACTION SYSTEM AND ROTATABLE FILTER CARTRIDGES

CROSS-REFERENCES TO RELATED APPLICATIONS

This application claims benefit of German Patent Application No. DE 10 2019 132 886.1, filed on Dec. 3, 2019, and which is hereby incorporated by reference in its entirety.

BACKGROUND OF THE INVENTION

Field of the Invention

The present invention relates to a mobile earth working machine, for example a road milling machine, a recycler, or a surface miner, the earth working machine encompassing:
  a working apparatus for material-removing working of a region of a substrate; and
  an extraction device that is embodied to extract dust-laden air from at least one machine region at at least one extraction location, and to exhaust extracted air at a discharge location different from the extraction location,
  the extraction device comprising a filter apparatus arranged along an operational flow path from the at least one extraction location to the discharge location, the filter apparatus encompassing:
  a filter housing;
  a filter element received in the filter housing, the filter element being embodied to remove dust particles from the air flowing through the filter apparatus; and
  a cleaning apparatus that is embodied to remove from the filter element dust particles that accumulate on the filter element during filtering operation.

DESCRIPTION OF THE PRIOR ART

An earth working machine of this kind embodied as a substrate milling machine, in particular a road milling machine, is known, for example, from DE 10 2004 007 716 B3.

In the existing art and preferably also in the present invention, the substrate material removed by the working apparatus is conveyed by means of a transport belt from a working apparatus housing, in which the working apparatus is received movably in order to execute a removing motion, to a delivery location. The working apparatus housing, constituting an occupational safety apparatus, shields the surroundings of the working apparatus from the working apparatus and from the substrate material removed by it. At the delivery location the conveyed removed substrate material as a rule is ejected, often onto a vehicle which accompanies the mobile, self-propelled earth working machine and which disposes of or further processes the received removed substrate material.

Substrate material pieces of different particle sizes are detached from the substrate at the point at which the removing working apparatus engages with the substrate to be worked. These substrate material pieces move with high kinetic energy in the working apparatus housing, and strike the wall of the working apparatus housing and collide with one another and/or with working surfaces of ejectors on the working apparatus and with the working apparatus itself. In the context of these collisions, and already upon removal of the substrate material by the working apparatus, dust of various particle sizes, down to fine dust, is produced. This dust contaminates the air extracted by the extraction device. In the working apparatus housing and/or upon transport of the removed substrate material, the dust can transition into the air space surrounding the removed substrate material. This is the case both for the existing art and for the present invention.

DE 102 23819 A1 already teaches to extract the dust-laden air, produced by earth working, at an extraction location located closer to the working apparatus, and to discharge it onto the transport belt at a discharge location located farther from the working apparatus. Dust in the air discharged at the discharge location can be removed from the air by way of a sprinkler device that sprinkles the surroundings of the discharge location with water, and/or by way of an electrostatic precipitation apparatus.

The teaching of DE 10 2004 007 716 B3, in order to increase the working life of a conveying fan conveying the dust-laden air, is to arrange a filter apparatus upstream from the conveying fan in the flow path of the dust-laden air from the extraction location to the discharge location, and thereby to clean the air before it reaches the conveying fan. The known filter apparatus encompasses a filter apparatus in which a plurality of so-called "filter cartridges," constituting filter elements, are received in order to achieve a filter area that is as large as possible.

Because the filter elements form on their dirt side, as the filter operating time increases, a filter cake that negatively affects the filtering effect of the respective filter element when a critical size is exceeded, DE 10 2004 007 716 B3 further teaches to remove filter cake from the filter elements by vibration, or by way of a compressed-air pulse effected on the clean side of the filter element. The filter cake removed from the filter element can be delivered onto the transport belt through a configuration, for example a flap or a deformable region, in the bottom of the filter housing. The filter housing is arranged above the transport belt. The transport belt is shielded from the external environment by a cover, so that substrate material lying on the transport belt cannot travel, or can travel to only a very minor extent, from the transport belt into the environment during conveyance to the delivery location.

Although the earth working machine known from DE 10 2004 007 716 B3 considerably reduces dust contamination in its immediate surroundings during earth working, this requires a large filter area in the filter apparatus, which must be achieved by way of a correspondingly large number of filter elements in the filter housing. This results in a large installation space requirement and a large outlay for installation and for regular replacement of the filter elements in the filter housing.

SUMMARY

The object of the present invention is therefore to refine the mobile earth working machine recited previously in such a way that identical or in fact better cleaning of the dust-laden air that occurs in the context of earth working becomes possible with a smaller number of filter elements than in DE 10 2004 007 716 B3, in which, by way of example, ten filter cartridges are in operation simultaneously in the filter housing of the known earth working machine.

This object is achieved according to the present invention by a mobile earth working machine of the kind recited previously in which the filter element is received in the filter housing rotatably around a rotation axis, the filter apparatus comprising a rotary drive system that is embodied to impart rotation to the filter element.

The filter housing of the present invention, like the filter housing known from DE 10 2004 007 716 B3, is preferably arranged above a transport means of a transport apparatus for conveying the removed substrate material away from the working apparatus housing to a discharge location. Dust particle material can advantageously be discharged from the filter housing onto this transport means. In the interest of efficient utilization of installation space, the filter element is preferably arranged in such a way that its rotation axis is arranged in a plane that is tilted relative to the transport direction by no more than 15° around a tilt axis that is parallel to the supporting substrate of the machine and is orthogonal to the transport direction. This plane, and particularly preferably the rotation axis, are preferably arranged parallel to the transport direction. According to this particularly preferred refinement, the filter cartridges of the known filter apparatus extend, during earth working and thus during filtering operation, with a tilt relative to the supporting substrate of the earth working machine but with a substantial component of extent parallel to the supporting substrate.

Because the supporting substrate of the earth working machine is usually flat and horizontal, or is tilted only negligibly with respect to the horizontal, gravity acts on a portion of the dirt side of the filter element which faces oppositely to the effective direction of gravity during filtering operation. Gravity therefore places a load toward the filter element on the dust particle material accumulating as a filter cake on the dirt side of that filter element portion, which makes removal of that material from the filter element difficult. As a result of the aforementioned mechanical and/or pneumatic cleaning actions, such as vibration and/or gas pressure pulses, the filter cake that forms on the known filter apparatus is reliably removed, as a rule, only from that portion of the dirt side of the filter element which faces in the effective direction of gravity, while that portion of the dirt side of the filter element which faces oppositely to the effective direction of gravity quickly clogs up and its filtering effect is impaired.

The filter elements of the existing art are approximately cylindrical filter elements, i.e. filter elements having a cylindrical envelope, the lateral surface of the filter elements representing the greatest proportion of the effective filter surface. After operation for a certain time, the upper sides of the lateral surfaces, which during operation face away from the transport apparatus and thus oppositely to the effective direction of gravity, are permanently occupied by filter cake that remains on the upper sides of the lateral surfaces despite the aforesaid cleaning actions. This persistence of filter cake on the upper side of the lateral surfaces of the filter elements becomes further intensified on the one hand due to a moisture content of the dust which promotes consolidation of the predominantly mineral dust, and on the other hand by a pleated configuration of filter material encircling the cylinder axis or cone axis of the filter elements, so that filter cake can become firmly immobilized in folds that are recessed into the filter material.

As a result of the rotatable arrangement of the filter element, any given portion thereof proceeding in a circumferential direction around the rotation axis of the filter element can be rotated into a direction in which gravity assists detachment of the filter cake from the filter element. All, or almost all, of the filter area of the filter element can thus remain continuously available for filtering operation thanks to the cleaning apparatus. As a consequence, the comparatively large filter area that is still required can be furnished by a smaller number of filter elements or, expressed even more generally, by a smaller volume occupied by filter elements. When the above-described rotatable filter element is used, furnishing the required filter area requires considerably less installation space than in the existing art. The smaller number of filter elements moreover requires less outlay in the context of replacing worn-out filter elements with fresh ones.

In the present Application, one filter element is discussed when describing the invention that is presented. This serves merely for illustration, and is not an indication of quantity. Although a single filter element can suffice, the filter apparatus of the present invention preferably comprises a plurality of filter elements, each of which is preferably mounted in the filter housing rotatably around a rotation axis. The rotation axes of the filter elements are then preferably parallel to one another for advantageously efficient utilization of the available installation space.

The filter elements of the present invention are also preferably approximately cylindrical filter elements having a cylindrical envelope, the cylinder axis then coinciding with the rotation axis of the filter element so that the envelope defines not only the installation space but also the motion space of the rotatable filter element. Alternatively, the filter elements can preferably be approximately conical filter elements that can then have a conical envelope. The cone axis is then, for the reason recited above, preferably also the rotation axis of the filter element. Approximately conical filter elements also include truncated-conical filter elements. The filter elements can deviate at their longitudinal ends from an ideal cylindrical or conical shape, for instance because the filter elements require a coupling configuration for coupling to a counterpart coupling configuration on the filter housing, and/or because porous material of the filter element, enveloped by the envelope, is to be positionally defined physically, for instance by corresponding end pieces, at both longitudinal end regions of the filter element.

The mobile earth working machine is preferably a self-propelled earth working machine that comprises a machine frame carried vertically adjustably by a plurality of crawler track units and/or wheel drive units. The machine frame in turn carries, preferably intentionally detachably, the working apparatus, which according to a preferred embodiment is a milling drum having a cylindrical base body on which milling bits, and preferably also ejectors, are arranged. The working apparatus housing mentioned previously, which, in an advantageous refinement, the earth working machine comprises in order to shield the working apparatus, is then a so-called "milling drum housing." In order to facilitate replacement of the milling bits, which are subjected to severe wear during earth-removing operation, quick-change bit holders, in which milling bits are intentionally detachably received, are arranged on the outer side of the cylindrical base body. For easier transport of the substrate material removed from the substrate by the milling bits, the quick-change bit holders are preferably arranged approximately helically on the base body in order to achieve, upon rotation of the milling drum, an axial conveying effect along the rotation axis of the milling drum which is exerted on the removed substrate material. Usually at least one respective quick-change bit holder helix proceeds from each axial longitudinal end of the milling drum to the axial milling-drum center, in order to generate an axial conveying effect from each longitudinal end to the axial milling-drum center.

In an advantageous refinement of the invention, the earth working machine can comprise a conveying fan for conveying the dust-laden air; the filter apparatus, in particular the filter element, is preferably located on the intake side of the conveying fan so that the air conveyed by the conveying fan reaches the conveying fan in a cleaned state. The fewer dust particles contained in the conveyed air, the less the abrasive effect of the conveyed air on the conveying fan. The conveying fan can encompass an axial fan that is robust with respect to dust-laden air. Alternatively, the conveying fan can encompass a radial fan that occupies less installation space than an axial fan having the same conveying performance.

When an "intentionally detachable" arrangement is discussed in the present Application, this refers to a nondestructively detachable arrangement that can be brought about, for example, by threaded connections, bayonet connections, and the like, in contrast to nondetachable arrangements, for example welded or riveted connections, that can be undone only destructively.

The cleaning effect achievable at the filter element by rotation of the filter element can be even further enhanced by the fact that a wiper bar, which is in direct contact with the filter element intermittently (for instance, when a material pleated in a circumferential direction around the rotation axis is used) or continuously (for instance, when a cylindrical or conical filter material is used) during a rotary motion of the filter element, is arranged parallel to the rotation axis at a distance therefrom. Rotation of the filter element can thus cause filter cake on the dirt side of the filter element thereby to be mechanically removed therefrom by the wiper bar. In the preferred case of a plurality of filter elements, at least one wiper bar interacts with each filter element. The wiper bar is preferably arranged rigidly on the filter housing.

In order to be able to exert wiping forces of locally different intensity on the filter element, the wiper bar can be embodied, on its edge region that is in direct contact with the filter element, with projections which follow one another in the rotation axis direction and which protrude from a carrier region, located farther from the filter element, of the wiper bar. Individual projections can elastically deform to different extents and can thus, because of their differing elastic deformation, exert different levels of wiping force at their end region located closer to the filter element.

What is important in terms of the force that a projection of the wiper bar exerts on the filter element is on the one hand the surface pressure occurring between the projection and the filter element, and on the other hand the deformational stiffness, in particular the flexural stiffness, of the projection. Porous material of the filter element can be delicate, and can therefore easily be damaged by an excessive surface pressure and excessive flexural stiffness. A good compromise embodying moderate surface pressure and not-excessive deformation stiffness is achieved by the fact that at least some of, preferably all of, the projections have a wiping region that is located farther away from the carrier region and is axially longer with respect to the rotation axis, and an axially narrower strut region that connects the wiping region to the carrier region. The load on the filter material as a result of the wiper bar can then be adjusted, by way of the dimensioning of strut regions, with sufficient precision that the wiper bar can in fact be produced from metal, preferably from stainless steel, for increased durability. The wiping region preferably abuts at least at times against the filter element. The strut region furnishes deformability for the projection, and thus elastic displaceability of the wiping region relative to the carrier region.

The filter element preferably comprises a porous filter material encircling the rotation axis. In order to increase the filter area at which dust particles are removed from the dust-laden air, and which thus represents an indication of the cleaning capability of the filter element, the filter material is preferably curved alternatingly convexly and concavely in a circumferential direction. A view of the filter element from outside, radially toward its rotation axis, is what governs the assessment of convex and concave curvature. The filter material can be inflected around inflection axes and/or curved with a radius of curvature around curvature axes, each inflection axis and/or each curvature axis preferably spanning a respective common plane with the rotation axis of the filter element. Particularly preferably, each inflection axis and/or each curvature axis is parallel to the rotation axis of the filter element. The filter element can thus, for example, comprise pleated filter material having a large filter area.

In addition to the wiping effect, the wiper bar can further enhance the achievable cleaning quality on the filter element by mechanical pulse transfer, by the fact that the wiper bar projects radially into a region of the filter element which is located between the points of radially greatest proximity of the filter material to the rotation axis and radially greatest distance of the filter material from the rotation axis. Pleated filter material, regardless of whether it is folded by inflection with a theoretically infinitesimal radius of curvature (realistically, with a radius of curvature less than 0.5 mm) or is curved by being curved with a finite radius of curvature (in particular with a radius of curvature of more than 0.5 mm), has with respect to the rotation axis a radially outer virtual envelope and a radially inner virtual envelope, between which the filter material is entirely or substantially entirely located. The virtual envelopes touch the respective outer and inner curvature vertices of the filter material. The wiper bar preferably projects into a region located between the radially outer and the radially inner envelope. Upon rotation of the filter element, the convex folds of the pleated filter material then successively strike the wiper bar, which on the one hand causes the aforementioned mechanical impact on the filter material, and on the other hand temporarily increases the circumferential spacing between two convex folds that are adjacent in a circumferential direction, so that filter cake that has accumulated on the radially inner concave fold arranged between the adjacent convex folds can drop off radially outwardly as a result of the increased circumferential spacing.

In order to utilize the wiper bar as efficiently as possible and assist its cleaning effect by means of gravity, the wiper bar preferably engages onto a portion of the filter element, preferably of the envelope of the filter element, which faces in the effective direction of gravity during filtering operation.

According to the present Application, a portion "faces" in a direction if a surface normal line proceeding from the portion has a component that faces in the indicated direction.

A worn-out filter element can be particularly easily and quickly replaced with a fresh one if it is detachably coupled at one longitudinal end, preferably at only one longitudinal end, to a filter element receptacle. It is sufficient if the filter element receptacle arranged on the filter housing is received in or on the filter housing rotatably around the rotation axis. The filter element itself then does not need to furnish any rotatability and/or comprise any configuration for transferring a drive torque from a rotary drive system to the filter element. A configuration of this kind interacting with the rotary drive system can be embodied solely on the filter element receptacle.

In principle, the filter element has a dirt side located upstream, in terms of an operational flow direction of the dust-laden air from the extraction location to the discharge location, from a porous filter material furnishing the filtering action of the filter element, and a clean side located downstream from the filter material.

Unless otherwise stated in the present Application, the indications "upstream" and "downstream" refer to the operational flow direction of the dust-laden air from the extraction location to the discharge location.

The extraction location is located closer to the working apparatus than the discharge location, since the dust load of the air in an air conduit leading toward the working apparatus rises with increasing proximity to the working apparatus.

In addition to, or preferably alternatively to, the aforementioned wiper bar, in order to enhance the achievable cleaning effect the cleaning apparatus can comprise a pneumatic apparatus that is embodied to increase the air pressure on the clean side above the air pressure existing on the dirt side. The pneumatic apparatus preferably encompasses at least one pneumatic pressure reservoir and at least one valve. The pneumatic pressure reservoir is preferably located on the filter housing, particularly preferably externally on the filter housing, so that it does not interfere with the at least one filter element in the interior of the filter housing.

In order to coordinate the cleaning actions with one another, the cleaning apparatus preferably comprises a control apparatus that controls both the operation of the pneumatic apparatus for pressure elevation on the clean side, and the rotary operation of the filter element.

For a reinforcing combination of the cleaning action made up of rotary operation and the pneumatic apparatus, the control apparatus is preferably embodied to operate the rotary drive system and the pneumatic apparatus simultaneously.

In order to produce an additional filter cake ejection effect on the dirt side by way of not only pressure elevation but also pressure pulses on the clean side, the control apparatus is preferably embodied to drive the pneumatic apparatus for percussive delivery of pneumatic pulses.

In order to ensure that the filter element is not always in the same rotational position when the air pressure is elevated by the pneumatic apparatus on the clean side, which might at least partly interfere with rotation of the filter element, according to an advantageous refinement of the present invention the control apparatus is embodied to adjust the duration of a pneumatic pulse, and/or the time interval between two immediately successive pneumatic pulses, in such a way that the duration and/or the interval is different from the reciprocal of the rotation speed of the filter element. In order to exert the largest possible number of pressure pulses per unit time on the clean side of the filter element, the duration and/or the interval is preferably less than the reciprocal of the rotation speed. In other words that the duration of a pneumatic pulse and/or the time interval between two immediately successive pneumatic pulses is less than a time required for one rotation of the filter element.

In order to reduce stress on the filter element of the filter apparatus during filtering operation, the filter apparatus can comprise a prefilter that is different from the filter element and is arranged preferably outside the filter housing, so that only pre-cleaned dust-laden air is directed to the filter element. So-called "cyclone" filters, which remove dust particles above a specific particle size from the dust-laden air, have proven successful as such prefilters. The result is that preferably only dust particles below a specific particle size or a specific particle size range reach the at least one filter element in the filter housing. The filter material of the filter element can be particularly well matched, in terms of its porosity and its permeability, to the particle size range of the dust particles in the pre-cleaned air, so that the cleaning effect of the filter element can be further enhanced.

The service life of the filter element can be increased by the fact that a filtering mode of the filter apparatus occurs only when it is actually needed. In urban areas already impacted in any case by fine dust, operation of the filter apparatus is therefore advisable in order to avoid an increase in fine dust contamination, whereas filtering of the extracted dust-laden air is not absolutely necessary during earth working outside urban areas. If the discharge location is sufficiently distant from an operator's platform of the earth working machine on which an operator controlling the earth working machine is active during earth working, the dust impact on the operator is negligible. When, in accordance with a preferred refinement, the initially extracted dust-laden air is discharged into a conduit that surrounds a transport apparatus conveying the removed substrate material, the discharged air comes into the open air only at the location where the substrate material is discharged or ejected from the transport apparatus. That discharge location is, as a rule, that point on the earth working machine which is located farthest from the operator's platform during earth-working operation as intended.

For switching over between filtration of the extracted air and mere conveyance, without a further filtering effect, of the unfiltered air, or of extracted air that has been prefiltered by a prefilter, for instance a cyclone filter, the filter apparatus can comprise a bypass valve shiftable between at least two different operating positions. In a filtering operating position, the bypass valve then connects the at least one extraction location to the exhaust location with passage through the filter element. In a bypass operating position, the bypass valve connects the at least one extraction location to the exhaust location while bypassing the filter element. The bypass valve preferably comprises only the filtering operating position and the bypass operating position.

The bypass valve can be constructed in physically simple fashion. It can comprise a movable valve component that comprises an exit opening of an upstream conveying conduit for the dust-laden air. Motion of the valve component allows the exit opening of the upstream conveying conduit to be flow-conveyingly connected to a desired one of two entry openings on a downstream side of the bypass valve, in particular a separating gap between the exit opening and entry openings.

In principle, the bypass valve can be movable manually between its operating positions associated with different air flow paths. Preferably, the bypass valve encompasses a valve drive system that, upon actuation of a control switch on the operator's platform of the earth working machine, shifts the bypass valve between at least two of its operating positions.

In physical terms, according to a preferred embodiment of the earth working machine according to the present invention the bypass valve, in the filtering operating position, can connect the at least one extraction location to the filter housing in such a way that an interior space of the filter housing which receives the filter element is part of the flow duct for dust-laden air which connects the at least one extraction location to the discharge location. The bypass valve can furthermore, in the bypass operating position, connect the at least one extraction location to the discharge location while bypassing the interior space of the filter housing which receives the filter element, and thus bypassing the filter element.

A further problem with the filter apparatus can be that the extracted dust-laden air can have a high moisture content and/or that the dust itself is damp. The reason for this can be, for example, water injection in the working apparatus housing, the purpose of which is to promptly immobilize dust that occurs during earth working in the immediate vicinity of the working apparatus. This moisture in the dust-laden air can cause dust and filter cake to become consolidated in the filter housing. Because the dust and the filter cake forming therefrom are predominantly mineral in nature, additional moisture often causes the moist filter cake to harden in mortar-like fashion. In order to allow consolidated mineral particle material of this kind to be capable of being detached from the inner walls of the filter housing, the filter apparatus can comprise a deformation actuator arrangement that interacts force-transferringly with at least one wall of the filter housing in such a way that by actuation of the deformation actuator arrangement, the at least one wall of the filter housing is deformable orthogonally to its wall surface.

For easier deformability of the at least one wall of the filter housing, that wall can be constituted from a material having a lower modulus of elasticity than other walls, wall portions, or housing portions of the filter housing. In the interest of maximum robustness of the filter housing, the latter is constituted to the greatest possible extent from metal, in particular sheet metal. The at least one deformable wall of the filter housing can be constituted from a plastic, in particular an elastomer, for instance vulcanized rubber or silicone rubber, or can encompass such a material at least in portions.

In principle, a deformation actuator arrangement that mechanically deforms the at least one wall can be provided, which arrangement, for instance, acts or does not act on the deformable wall with a displaceable plunger, depending on the plunger position. In order to avoid additional components, the deformation actuator arrangement preferably encompasses or is the pneumatic apparatus and/or the conveying fan that conveys the dust-laden air from at least one extraction location to the discharge location. Because the filter housing is preferably arranged on the intake side of the conveying fan, operation of the conveying fan generates in the filter housing a negative pressure with respect to ambient pressure, while the above-described pneumatic apparatus is embodied to generate a positive pressure in the filter housing with respect to ambient pressure. An oscillating or alternating pressure impingement on the interior space of the filter housing can cause the at least one deformable wall to be subjected to a flexing deformation so that consolidated hardened dust particle material, which originally was adhering to the deformable wall, flakes off from it. This is possible with an advantageous flexing amplitude when the wall is constituted, as indicated above, at least partly, preferably entirely, from a plastic, in particular an elastomer, for example natural rubber or vulcanized rubber.

In order to remove dedusted dust particle material from the filter housing, whether dust particle material from the filter element or material from a wall of the filter housing, the filter housing can comprise an outlet configuration displaceable between an open position and a closed position, for example a movable and/or deformable portion of a filter housing floor which, in its open position, opens an outlet opening in the filter housing. Dust particle material that has accumulated in the filter housing can be removed from the filter housing through the outlet opening. At least the floor of the filter housing is preferably embodied as the above-described deformable wall, so as thereby to allow the outlet opening also to be embodied without an excessive increase in the number of components required.

As has already been mentioned previously, the earth working machine preferably comprises a transport apparatus with which substrate material removed by the working apparatus is conveyable away from the working apparatus to a delivery location. In order for the quantities of removed substrate material which occur per unit time to be capable of being reliably transported away, the transport apparatus preferably encompasses as a transport means at least one conveyor belt, preferably at least two conveyor belts that follow one in a conveying direction, which is/are enclosed over at least 90% of its/their conveying length in order to reduce dust contamination of the surroundings of the earth working machine. Other transport apparatuses, however, for example screw conveyors and the like, are nevertheless also not excluded.

According to an advantageous refinement, the filter housing is arranged above the transport apparatus in such a way that when the outlet configuration is in the open position, the outlet opening opens toward the transport apparatus. The dust particle material, as a rule minerally consolidated, can then leave the filter housing in response to gravity and reach the transport apparatus, where it is transported along with the removed substrate material to the delivery location.

BRIEF DESCRIPTION OF THE DRAWINGS

The present invention will be explained below with reference to the appended drawings, in which.

DETAILED DESCRIPTION

Figure 1:
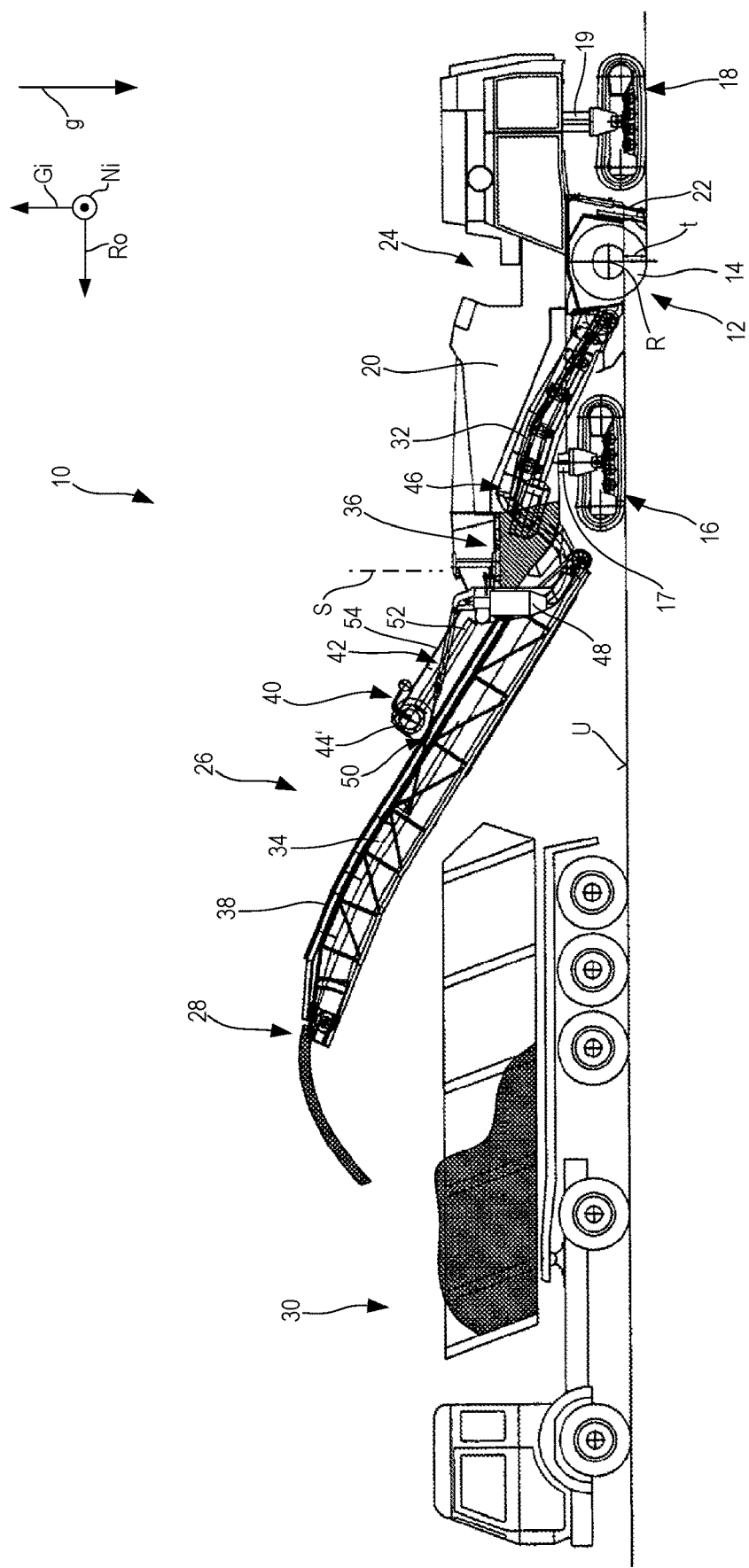
FIG. 1 is a schematic side view of an earth working machine according to the present invention during processing that removes substrate material.

In FIG. 1, an earth working machine (hereinafter referred to simply as a "machine") according to the present invention is labeled in general with the number 10. What is depicted by way of example as machine 10 according to the present invention is a large road milling machine, working apparatus 12 of which, having a milling drum 14 known per se as is typical for large road milling machines, is arranged between front drive units 16 and rear drive units 18. Drive units 16 and 18, each drivable for propelled motion preferably by a hydraulic motor (not depicted), are steerable, and carry a machine frame 20 that in turn carries working apparatus 12. Machine 10 is thus a self-propelled vehicle.

Figure 2:
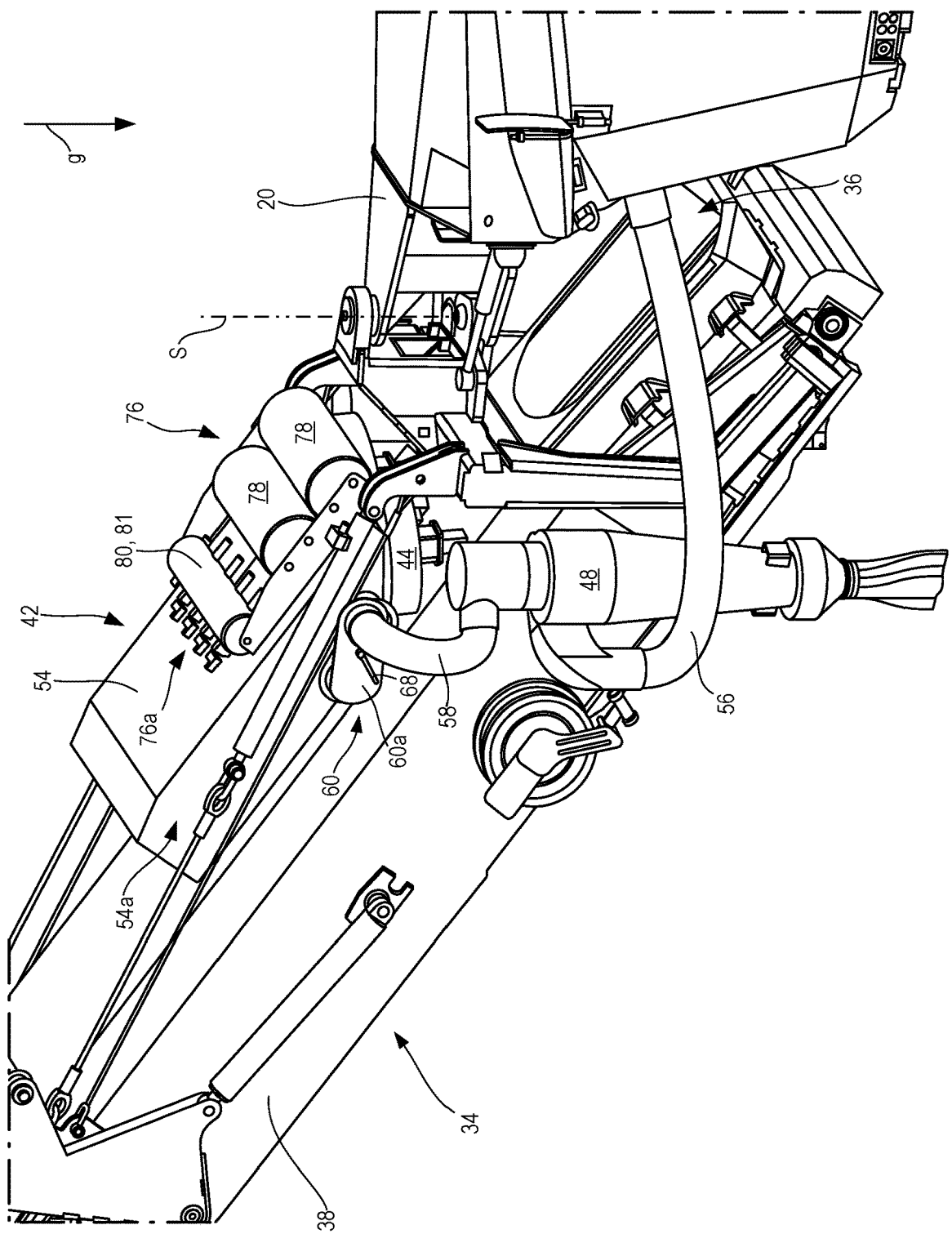
FIG. 2 is a perspective view of an enlarged portion of the ejector belt of the transport apparatus, having arranged thereon a filter apparatus of the earth working machine of FIG. 1.
Figure 3:
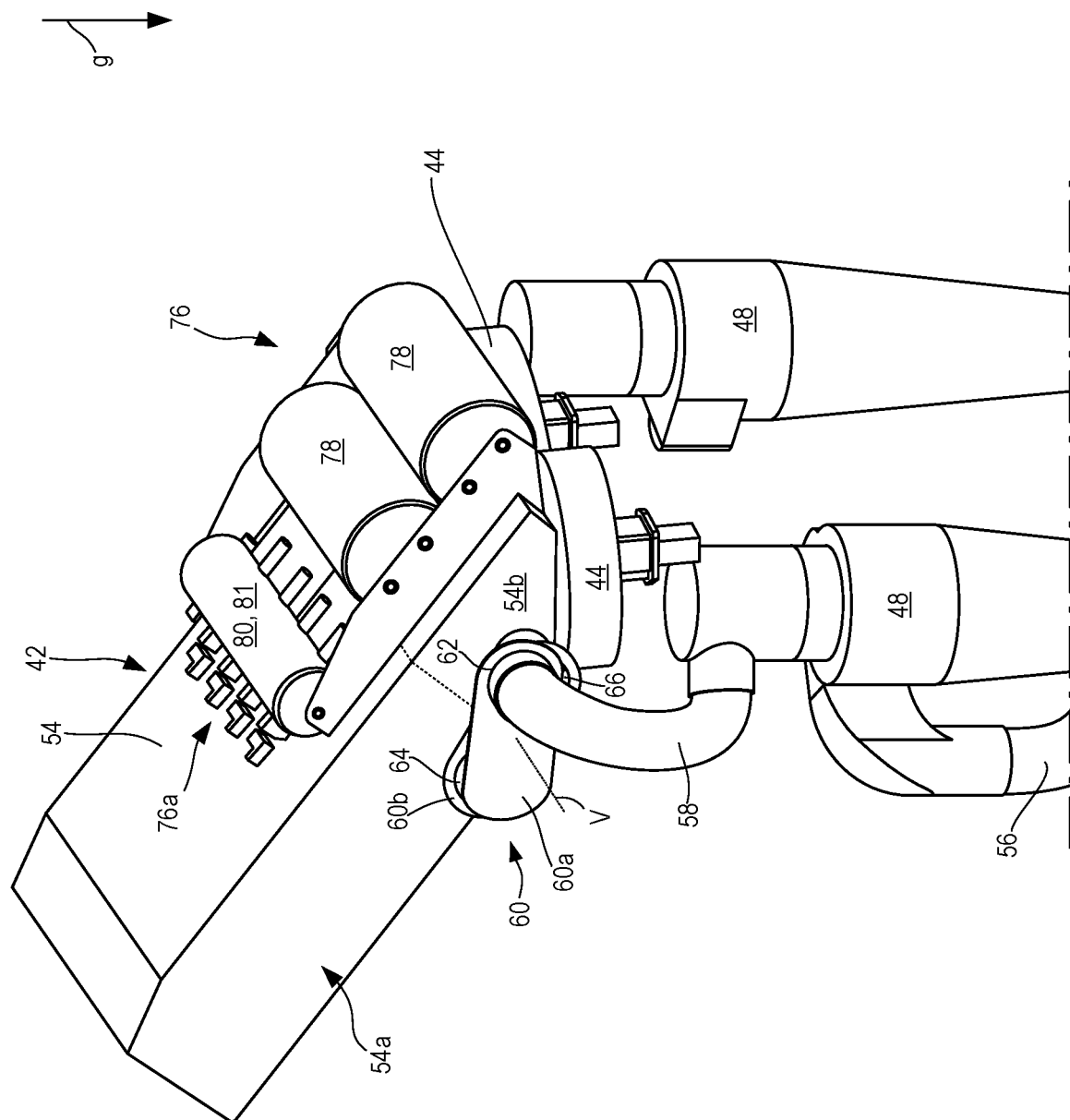
FIG. 3 is a schematic perspective view of the filter apparatus of FIG. 2, including a prefilter, of the earth working machine of FIG. 1.

The effective direction of gravity is labeled with an arrow g in FIGS. 1 to 3.

Milling drum 14, rotatable around a rotation axis R that is orthogonal to the drawing plane of FIG. 1 and proceeds parallel to pitch axis Ni of machine 10, is shielded with respect to the external surroundings of machine 10 by a milling drum housing 22 that supports milling drum 14 rotatably around rotation axis R. In order to enable earth working as intended by machine 10, milling drum housing 22 is open toward substrate U, on which machine 10 stands with drive units 16 and 18 and which milling drum 14 removes.

Machine frame 20 is connected to drive units 16 and 18 via front lifting columns 17 and rear lifting columns 19, vertically adjustably along yaw axis Gi, with the result that, for example, the milling depth t of milling drum 14 is adjustable.

Machine 10 can be controlled from an operator's platform 24. Operator's platform 24 can be roofed in a manner known per se.

Substrate material removed by milling drum 14 during earth working as intended is conveyed by a transport apparatus 26 from working apparatus 12 to a delivery location 28 where, in the example depicted, it is transferred to a transport truck 30 that, during earth working, precedes and accompanies machine 10 at a distance in the direction of roll axis Ro.

Transport apparatus 26 encompasses a receiving belt 32 located closer to working apparatus 12 and an ejector belt 34 that interacts with receiving belt 32 and is located farther from working apparatus 12. Receiving belt 32 is mounted on machine frame 20 in circulation-capable fashion, but unmodifiably with regard to its orientation relative to machine frame 20. At a transfer point 36, receiving belt 32 transfers the material conveyed by it onto ejector belt 34, which conveys the received material to delivery location 28. Ejector belt 34 is likewise circulation-capable but is pivotable relative to machine frame 20 around a pivot axis S parallel to the yaw axis and is tiltable around a tilt axis orthogonal to pivot axis S, so that delivery location 28, which coincides with the ejecting longitudinal end of ejector belt 34, is movable approximately over the surface of a spherical shell in order to adapt delivery location 28 to the respective accompanying vehicle.

Transport apparatus 26 is enclosed along its entire length by an enclosure 38 in order to avoid contamination of the external surroundings of transport apparatus 26 with dust and with material that might possibly drop off transport apparatus 26. That part of enclosure 38 which is located above receiving belt 32 is implemented for the most part by machine frame 20.

To further reduce emissions of dirt, in particular dust, from machine 10 because of working apparatus 12, the latter encompasses an extraction device 40 having a filter apparatus 42.

In order to indicate that extraction device 40 can be configured in different ways, extraction device 40 is depicted in FIG. 1 with a conveying fan 44' at the top end of a filter housing 54. Filter apparatus 42 is located on the intake side of conveying fan 44' so that air cleaned by filter apparatus 42 passes through conveying fan 44' of extraction device 40 of FIG. 1.

Extraction device 40 extracts dust-laden air at an extraction location 46 that can be located, for example, above receiving belt 34, and conveys the dust-laden air, in the order indicated, through a prefilter 48 and through filter apparatus 42 to a discharge location 50 that either can be an outlet on conveying fan 44' which discharges directly into the external surroundings of machine 10 or can be, above ejector belt 34, an opening in enclosure 38 through which the cleaned air is taken back to transport apparatus 26, so that the cleaned air, together with the removed substrate material, emerges at delivery location 28 into the surroundings of machine 10.

Shown in filter apparatus 42 is a filter element 52 whose longitudinal axis is oriented substantially parallel to the transportation direction or to the running direction of ejector belt 34.

Filter apparatus 42 is shown in FIGS. 2 and 3 in greater detail than in FIG. 1. Filter apparatus 42 encompasses filter housing 54 in which (in the example depicted) two, but very generally a plurality of, filter elements 52 are arranged.

Unlike in FIG. 1, in FIGS. 2 and 3 conveying fan 44 is depicted in a lower portion of filter housing 54. Filter housing 54 or filter apparatus 42 is nevertheless, as in FIG. 1, located functionally on the intake side of conveying fan 44.

FIG. 3 shows in particular the mirror-symmetrical configuration of extraction device 40 in terms of first and second hose ducts 56 and 58, prefilter 48, and conveying fan 44, which are each provided in pairs with respect to a mirror symmetry plane spanned by yaw axis Gi and roll axis Ro, the mirror symmetry being applicable to an extended reference state in which ejector belt 34 and the transport device of ejector belt 34 are located in the mirror symmetry plane.

Dust-laden air is conveyed by conveying fan 44 through a first hose duct 56 from extraction location 46 to prefilter 48 configured as a cyclone filter, where a pre-cleaning of the dust-laden air occurs in a manner known per se. The pre-cleaned air, as a rule now laden only with fine dust having a particle size below a threshold value determined by the cyclone filter, is conveyed via a second hose duct 58 to a bypass valve 60, and from there the pre-cleaned air enters filter housing 54.

Filter housing 54 comprises a larger compartment 54a in which filter elements 52 are received, and a smaller compartment 54b in which no filter elements 52 are received. Filter elements 52 are therefore located in an interior space 57 of filter housing 54 or of compartment 54a.

Bypass valve 60 encompasses a valve component 60a that is movable relative to filter housing 54, and a filter-housing-mounted valve component 60b. Movable valve component 60a can be pivotable, for example, 180° around a valve axis V relative to filter-housing-mounted component 60b. An exit opening 62 of second hose duct 58, constituting a conveying conduit that is upstream with respect to bypass valve 60, is connected to movable valve component 60a via an attachment configuration 61 protruding from the preferably plate-shaped movable valve component 60a that is configured to be flat, while filter-housing-mounted valve component 60b comprises two entry openings 64 and 66, of which entry opening 64 leads via an attachment configuration 63a into compartment 54a of filter housing 54 in which filter elements 52 are received, whereas entry opening 66 leads via an attachment configuration 63b into compartment 54b having no filter elements. A handle 68 serves for adjustment of bypass valve 60 between its filtering operating position, in which bypass valve 60 connects exit opening 62 to entry opening 64, and the bypass operating position in which bypass valve 60 connects exit opening 62 to entry opening 66. Alternatively, instead of handle 68, a motorized drive system can also be provided for adjusting bypass valve 60 between its two operating positions.

A respective elastic seal configuration 65a, 65b, surrounding the respective entry opening 64, 66, can protrude from filter-housing-mounted valve component 60*b* from bounding surface 60*b*1 facing toward movable valve component 60*a*, in order to span in gas-tight fashion a separating gap between valve components 60*a* and 60*b*.

Conveying fan 44 always extracts air via the preferably smaller compartment 54*b*, having no filter elements 52, of filter housing 54. Depending on the position of bypass valve 60, conveying fan 44 aspirates air in compartment 54*a* via filter elements 52, or directly via entrance opening 66 without further filtration.

The preferably plate-shaped movable valve component 60*a* is constructed asymmetrically in such a way that it closes off that entry opening on filter-housing-mounted valve component 60*b* which is not connected to exit opening 62 of movable valve component 60*a*. Undesired aspiration of leakage air by conveying fan 44 is thereby avoided, so that the entire conveying effect of conveying fan 44 is applied to the air flow that is actually intended to be conveyed.

Figure 4:
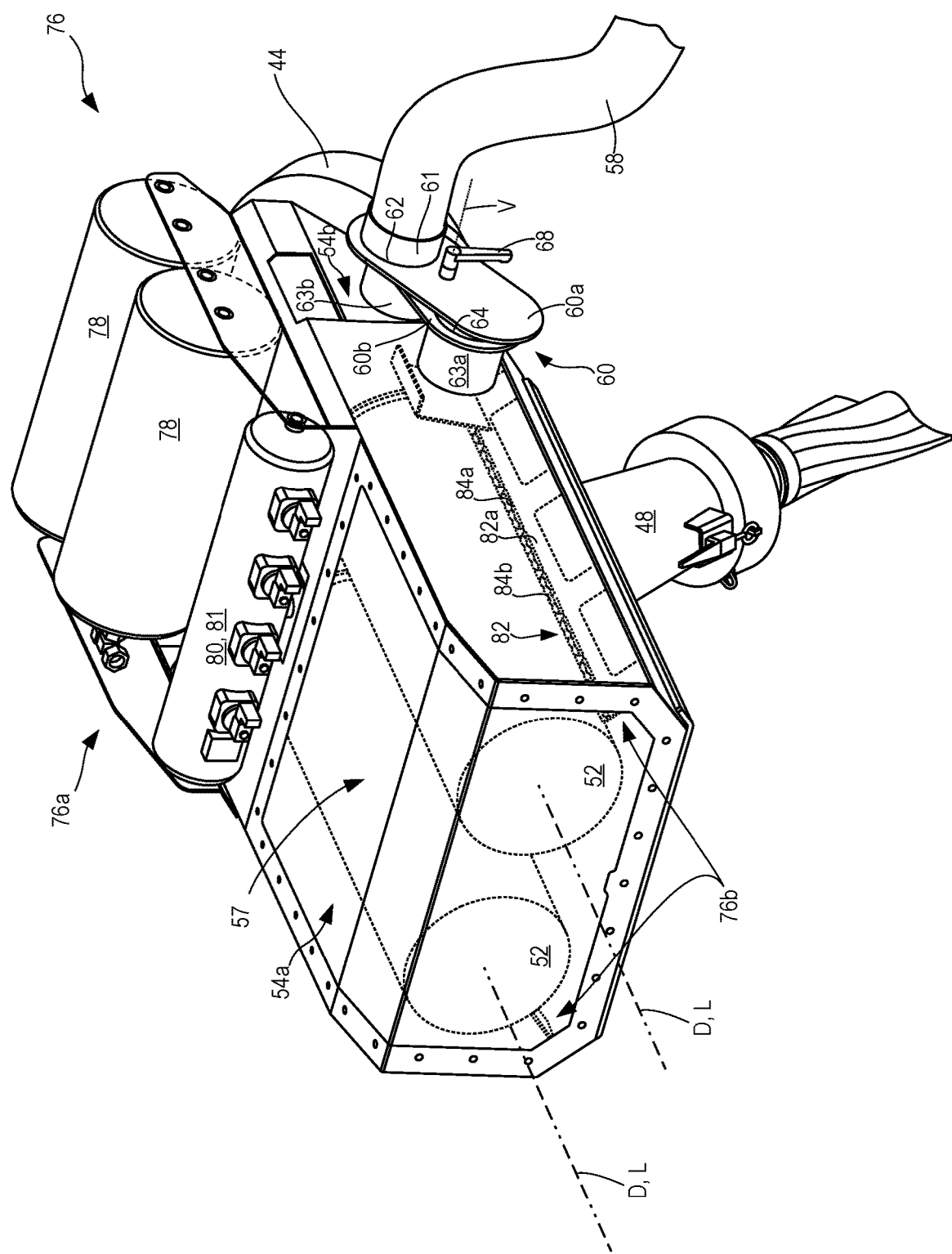
FIG. 4 is a schematic perspective view, obliquely from the front and above, of the filter apparatus of FIG. 3 without a prefilter.

In FIG. 4 two filter elements 52, by way of example, are depicted with dashed lines in interior space 57 of compartment 54*a*. The two filter elements 52 each extend along a longitudinal axis L that is also a rotation axis D of the respective filter element 52. Filter elements 52 are arranged with parallel longitudinal axes L. Filter elements 52 can each be rotated around rotation axis D by a rotary drive system 70 shown in FIG. 5.

Filter elements 52 are mounted at only one longitudinal end, in cantilevered fashion, on rotary bearings 72, from which they protrude along their longitudinal axis L or rotation axis D. Rotary bearings 72, which represent embodiments of filter element receptacles recited above, are arranged on filter housing 54 and comprise a coupling configuration to which a counterpart coupling configuration on a filter element 52 is detachably couplable. The result is that filter elements 52 on the one hand can be replaced quickly, and on the other hand can be arranged in filter housing 54 rotatably around rotation axis D with no relative motion means of their own. Rotary drive system 70 preferably interacts directly with rotary bearings 72 so that filter element 52 does not itself need to comprise any configuration for direct force transfer with rotary drive system 70. Rotary drive system 70 and rotary bearings 72 can comprise mutually meshing gears or tooth structures, the gear of rotary drive system 70 being driven by a motor. That motor can be a hydraulic motor or, preferably, an electric motor.

Thanks to the rotatability of filter elements 52, a different circumferential portion of filter element 52 can always be arranged so that it faces in effective direction of gravity g, so that gravity consequently assists the detachment and dropping of filter cakes that accumulate on the dirt side of filter material of filter elements 52 during filtering operation. A circumferential portion of filter element 52 faces in effective direction of gravity g when a surface normal vector proceeding from the surface of the filter material or from the envelope of the filter material has at least a component proceeding in the effective direction of gravity.

Figure 6:
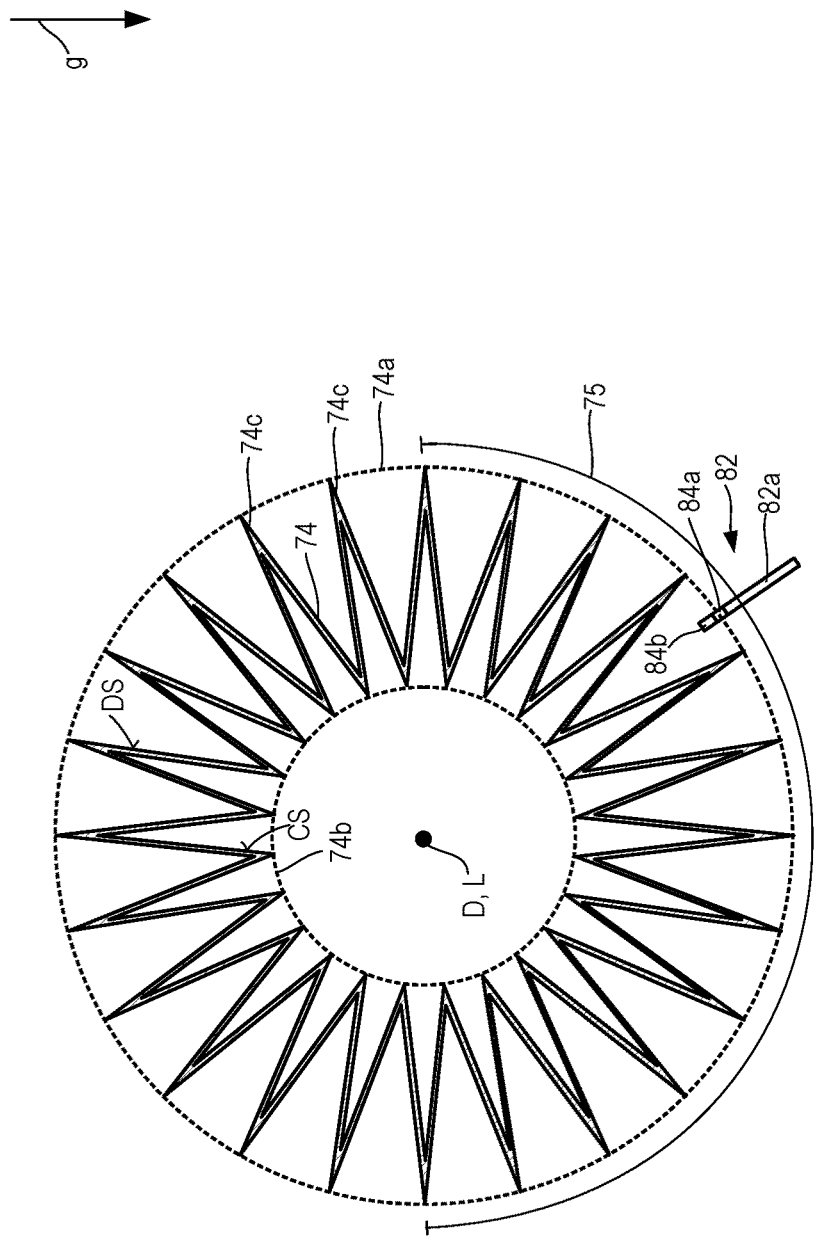
FIG. 6 is a schematic exemplifying cross-sectional view through the filter material of a filter element of the filter apparatus of FIGS. 1 to 5.

FIG. 6 is a simplified cross-sectional view through filter element 52 in a section plane orthogonal to rotation axis D. In the example depicted, filter material 74 is a pleated filter material 74 that proceeds around rotation axis D in zigzag fashion between a (by way of example) cylindrical radially outer envelope 74*a* and a (by way of example) cylindrical radially inner envelope 74*b*. Merely for explanation: for effective direction of gravity g shown by way of example in FIG. 6, circumferential portion 75 of filter material 74 faces in effective direction of gravity g. That side of filter material 74 which faces away from rotation axis D is dirt side DS, on which filter cake forms during filtering operation. The opposite side of filter material 74, facing toward rotation axis D, is clean side CS, onto which air that has been cleaned after passing through filter material 74 flows. Filter material 74 can be any porous material, for example a nonwoven filter or a filter paper.

Filter apparatus 42 comprises a cleaning apparatus 76 for removing filter cake from filter material 74 of filter elements 52. In the example depicted, cleaning apparatus 76 encompasses a pneumatic cleaning sub-apparatus 76*a* and a mechanical cleaning sub-apparatus 76*b*.

In the example depicted, pneumatic cleaning sub-apparatus 76*a* encompasses two compressed-air tanks 78 and a valve arrangement 80 which is pneumatically connected to compressed-air tanks 78 and is embodied to release compressed air in pulsed fashion from compressed-air tanks 78 toward clean side CS of filter material 74 of filter elements 52, so that pressure pulses which increase the air pressure on clean side CS as compared with dirt side DS are exerted on filter material 74. As a result of those pressure pulses, filter cake located on dirt side DS can be detached or in fact ejected from dirt side DS. A deformation of filter material 74, which assists the detachment of filter cake on dirt side DS, can also be brought about by the pressure pulses. A control apparatus 81, which controls the operation of pneumatic cleaning sub-apparatus 76*a* and of rotary drive system 70, can be received in the housing of valve arrangement 80. The pneumatic cleaning sub-apparatus 76*a* may also be referred to as a pneumatic pressure source 76*a*. The control apparatus 81 may also be referred to as a controller 81.

The pressure pulses brought about by pneumatic cleaning sub-apparatus 76*a* are coordinated, in terms of their duration and/or the interval between two successive pressure pulses, with the rotary motion of filter elements 52 so as to ensure that when a pressure pulse is applied, it is not always the same circumferential portion of filter material 74 which is facing in effective direction of gravity g. It is thereby possible to ensure that the entire circumference of filter element 52 is affected by the cleaning action during a cleaning procedure.

Alternatively or, as in the exemplifying embodiment depicted, in addition to pneumatic cleaning, a mechanical cleaning sub-apparatus 76*b* is provided which assists the cleaning of filter material 74 by mechanical stress thereon.

Mechanical cleaning sub-apparatus 76*b* encompasses a wiper bar 82 that extends along longitudinal axis L or rotation axis D of filter element 52. The wiper bar preferably extends through the radially outer (cylindrical, in the example depicted) envelope 74*a* toward rotation axis D of filter element 52, as depicted in FIG. 6. Upon rotation of filter element 52 around rotation axis D, the radially outer folds 74*c* of the pleated filter material then wipe against wiper bar 82, with the result that on the one hand the spacing between two radially outer folds 74*c* that are directly successive to one another in a circumferential direction becomes temporarily increased, so that filter cake received between those folds can more easily fall out; and on the other hand, after the abutting engagement of wiper bar 82 with a radially outer fold 74*c* ends, a force that acts on radially outer fold 74*c* and deforms it in a circumferential direction abruptly ends, so that radially outer fold 74*c* that was initially deformed in a circumferential direction returns to its original conformation because of its material elasticity, which can have a further filter-cake-loosening effect. Lastly, wiper bar 82 wipes mechanically along at least a portion of filter material 74 and thereby mechanically scrapes filter cake off filter material 74.

In order to reduce stress on the porous, and therefore possibly delicate, filter material 74, wiper bar 82 has on its side facing toward rotation axis D a plurality of projections 84 that each protrude from a carrier region 82a of wiper bar 82 toward rotation axis D and thus toward filter element 52. Each projection 84 comprises a strut region 84a located closer to carrier region 82a and connected preferably integrally thereto, and a wiper region 84b adjoining strut region 84a toward rotation axis D and connected preferably integrally thereto. Strut region 84a of a projection 84 is embodied to be shorter in a longitudinal direction of wiper bar 82 than wiper region 84b, which projects on both sides beyond strut region 84a preferably in a longitudinal direction of wiper bar 82. Wiper region 84b of each projection 84 thus furnishes a wiping length that is as long as possible, and strut region 84a defines the deformation resistance of projection 84 and thus the maximum load applied by wiper bar 82 onto filter material 74. Wiper bar 82 can thus be manufactured advantageously from stainless steel sheet. All projections 84 are preferably embodied identically.

Figure 5:
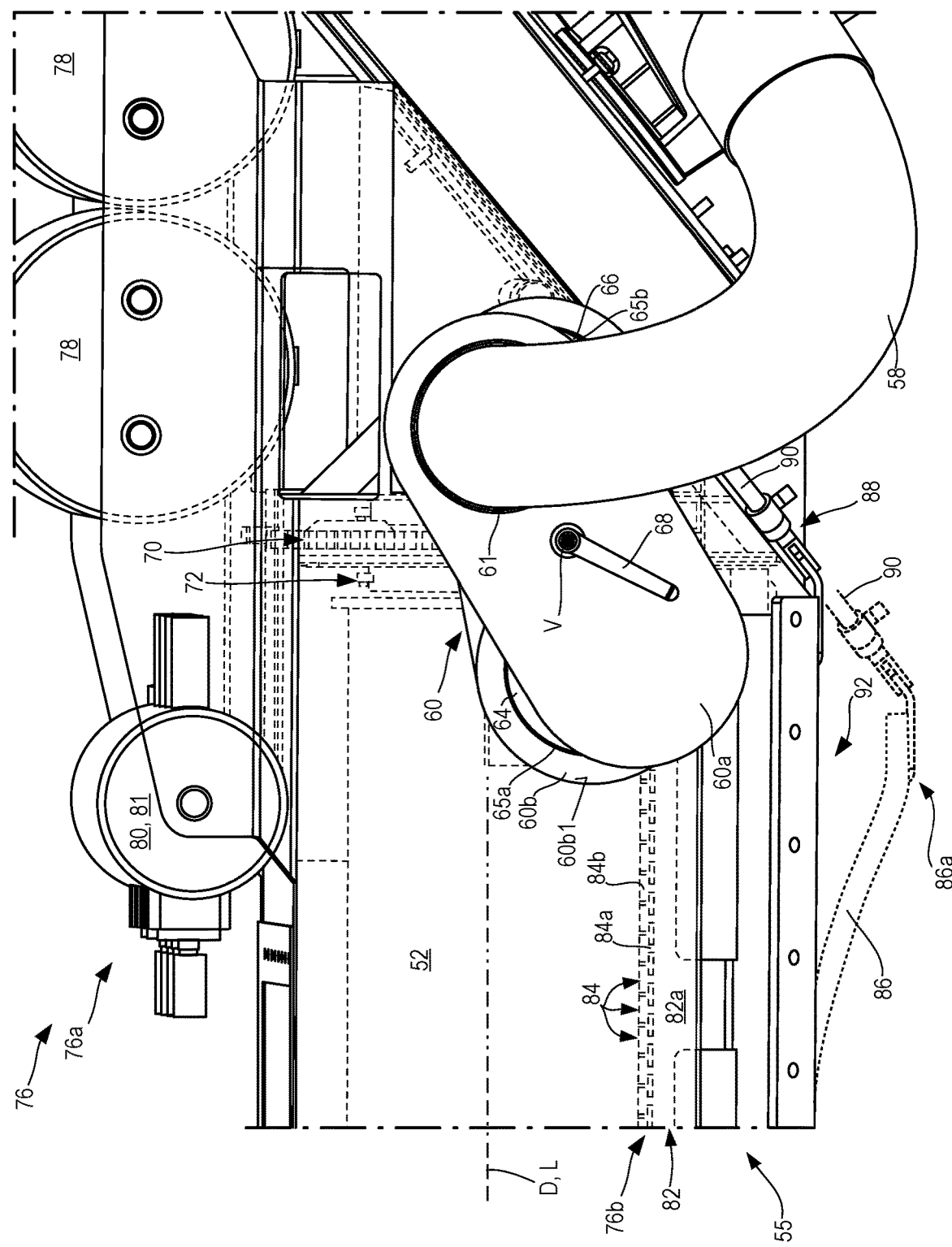
FIG. 5 is an enlarged schematic side view of the bypass valve of the filter apparatus of the earth working machine of FIGS. 1.

When filter apparatus 42 is in the operationally ready installed state, filter housing 54 comprises a housing floor 86 that faces toward ejector belt 34 and is shown in FIG. 5 with dashed lines in a position that is lifted away from remaining filter housing 55, i.e. from filter housing 54 without housing floor 86. In the usual, non-lifted position, housing floor 86 is concealed by the side wall of filter housing 54.

Housing floor 86 is manufactured from an elastomeric material, for example natural rubber, vulcanized rubber, silicone rubber, etc. Housing floor 86 can be reinforced with inserts, for example fabric or plies, in order to increase the tearing strength of housing floor 86. In the example depicted, remaining filter housing 55 is made of sheet metal. That need not be the case, however. Filter housing 54 can comprise more than just one wall made of an elastomeric material.

At its lower end 86a, in the installation situation tilted with respect to effective direction of gravity g as is evident from FIGS. 1 to 3, housing floor 86 is coupled to an actuator 88 fastened on filter housing 54 or on enclosure 38. Actuator 88 can be a pneumatic or hydraulic actuator and can encompass as an actuation member 90, for example, a piston rod extendable out of and retractable into a cylinder, or can be an electrical or electromagnetic actuator whose actuation member 90 is electrically or electromagnetically displaceable.

Actuation member 90 of actuator 88 is shown with dashed lines in its extended position. With actuation member 90 in this extended position, lower longitudinal end 86a of housing floor 86 is lifted away from remaining filter housing 55 so that there is formed between housing floor 86 (more precisely its lower longitudinal end 86a) and remaining filter housing 55 an outlet opening 92 through which material that has accumulated in filter housing 54, in particular in compartment 54a receiving filter element 52, in the course of operation can be released out of interior space 57 of filter housing 54 toward transport apparatus 26, more precisely toward ejector belt 34. This is, as a rule, material that the extracted air has entrained and that has been filtered out of the air by filter elements 52 and/or has become deposited on the inner walls of filter housing 54. The material can encompass removed substrate material in the form of anything from dust to fragments of densified material.

The removed substrate material usually has a high moisture content, since water is usually sprayed into milling drum housing 22 in order to suppress excessive dust generation and cool the milling bits. The removed mineral substrate material tends to densify in a moist environment, a property that is in fact exploited in order to immobilize dust by spraying in water. Rock-hard mineral deposits can thereby form on the inner surfaces of the filter housing.

The deformable embodiment of housing floor 86 thanks to the use of elastomeric material has a further advantageous effect: as a result of the deliberate deformability of housing floor 86, substrate material caked onto it can be detached from housing floor 86. The same applies to any other wall of filter housing 54, which can likewise have adhering substrate material removed from it by deformability orthogonally to its wall surface. It is therefore advantageous if further walls of filter housing 54 are constituted from elastomeric material or from thin sheet steel having a comparatively low resistance to bending or flexing.

Deformation of an elastomeric wall of filter housing 54 can be accomplished in simple fashion by means of cleaning apparatus 76, more precisely by means of pneumatic cleaning sub-apparatus 76a. When the latter increases the pressure in interior space 57 of filter housing 54, the deformable walls of filter housing 54 bulge outward, with the result that consolidated mineral layers of removed substrate material adhering thereto flake off and can lie loose, as fragments, in interior space 57 of filter housing 54. The flaked-off fragments can then be discharged through outlet opening 92 onto transport apparatus 26 and transported by it for ejection at delivery location 28. Valve arrangement 80 can increase the pressure in interior space 57 of filter housing 54, in particular in compartment 54a, in simple fashion via pneumatic lines connected thereto.

Valve arrangement 80 can be actuatable from operator's platform 24. Control apparatus 81 can furthermore initiate a cleaning operation of filter housing 54 at predetermined time intervals by corresponding application of control to valve arrangement 80.

Just as pneumatic cleaning sub-apparatus 76a can generate an overpressure in filter housing 54, conveying fan 44 can generate a negative pressure in filter housing 54, since filter housing 54 is located on the intake side of conveying fan 44. By appropriate coordination between the operation of pneumatic cleaning sub-apparatus 76a and that of conveying fan 44, for example by alternating operation of those devices, filter housing 54, and thus its walls, can be exposed to an alternating overpressure/negative-pressure stress that further facilitates a flexing motion of walls of filter housing 54 in order to detach hardened substrate material caked onto them.

Compressed-air tanks 78 can be connected, if applicable likewise via valve arrangement 80, to an onboard compressor that ensures a constant or quasi-constant compressed-air level in compressed-air tanks 78.

The invention claimed is:

1. A mobile earth working machine, comprising:
a working apparatus configured to remove material from a region of a substrate; and
an extraction device configured to extract dust-laden air generated by the working apparatus from at least one machine region at at least one extraction location, and to exhaust extracted air at a discharge location different from the extraction location, the extraction device including a filter apparatus arranged along an operational flow path from the at least one extraction location to the discharge location, the filter apparatus including:

a filter housing;

a filter element rotatably mounted in the filter housing such that the filter element is rotatable about a rotation axis, the filter element being configured to remove dust particles from the air flowing along the operational flow path through the filter apparatus;

a cleaning apparatus configured to remove from the filter element dust particles accumulated on the filter element during filtering operation; and a rotary drive system configured to rotate the filter element about the rotation axis;

wherein the filter apparatus includes a filter element receptacle received in the filter housing to be rotatable around the rotation axis; and wherein the filter element is detachably coupled at one longitudinal end of the filter element in a cantilever fashion to the filter element receptacle.

2. The mobile earth working machine of claim 1, wherein:
the cleaning apparatus includes a wiper bar arranged parallel to the rotation axis at a distance from the rotation axis, the wiper bar being in direct contact with the filter element at least intermittently during rotary motion of the filter element.

3. The mobile earth working machine of claim 2, wherein:
the wiper bar includes an edge region in direct contact with the filter element, the edge region including projections aligned parallel to the rotation axis, the projections protruding from a carrier region of the wiper bar, the carrier region being located farther from the filter element than is the edge region.

4. The mobile earth working machine of claim 3, wherein:
at least some of the projections include a wiping region and a strut region connecting the wiping region to the carrier region, the wiping region being longer in a direction parallel to the rotation axis than is the strut region.

5. The mobile earth working machine of claim 2, wherein:
the filter element comprises a porous filter material surrounding the rotation axis and shaped alternatingly convexly and concavely in a circumferential direction such that the filter element includes points of radially greatest proximity to the rotation axis and points of radially greatest distance from the rotation axis; and
the wiper bar projects radially into a region of the filter element located between the points of radially greatest proximity to the rotation axis and the points of radially greatest distance from the rotation axis.

6. The mobile earth working machine of claim 1, wherein:
the filter element includes a filter material having a dirt side and a clean side, the dirt side and the clean side being located upstream and downstream, respectively, in terms of an operational flow direction of the dust-laden air from the at least one extraction location to the discharge location; and
the cleaning apparatus includes a pneumatic pressure source configured to increase an air pressure on the clean side above an air pressure existing on the dirt side.

7. The mobile earth working machine of claim 6, wherein:
the cleaning apparatus includes a controller configured to operate the rotary drive system and the pneumatic pressure source simultaneously.

8. The mobile earth working machine of claim 7, wherein:
the controller is configured to drive the pneumatic pressure source for percussive delivery of pneumatic pulses to the filter element.

9. The mobile earth working machine of claim 8, wherein:
the controller is configured to drive the pneumatic pressure source such that a duration of a pneumatic pulse is less than a time required for one rotation of the filter element.

10. The mobile earth working machine of claim 1, wherein:
the controller is configured to drive the pneumatic pressure source such that an interval between two immediately successive pneumatic pulses is less than a time required for one rotation of the filter element.

11. The mobile earth working machine of claim 1, wherein:
the filter apparatus includes a bypass valve shiftable between a filtering operating position and a bypass operating position;
in the filtering operating position the bypass valve connects the at least one extraction location to the discharge location through the filter element; and
in the bypass operating position the bypass valve connects the at least one extraction location to the discharge location while bypassing the filter element.

12. The mobile earth working machine of claim 11, wherein:
the filter housing includes an interior space, the filter element being received in the interior space;
in the filtering operating position of the bypass valve the interior space of the filter housing is a part of the operational flow path connecting the at least one extraction location to the discharge location; and
in the bypass operating position of the bypass valve the at least one extraction location is connected to the discharge location while bypassing the interior space.

13. The mobile earth working machine of claim 1, wherein:
the filter housing includes at least one deformable wall; and
the filter apparatus further includes a deformation actuator arrangement configured to interact with and transfer force to the at least one deformable wall of the filter housing such that by actuation of the deformation actuator arrangement the at least one deformable wall of the filter housing is deformable orthogonally to a wall surface of the at least one deformable wall by a flexing deformation.

14. The mobile earth working machine of claim 13, wherein:
the filter element includes a filter material having a dirt side and a clean side, the dirt side and the clean side being located upstream and downstream, respectively, in terms of an operational flow direction of the dust-laden air from the at least one extraction location to the discharge location;
the cleaning apparatus includes a pneumatic pressure source configured to increase an air pressure on the clean side above an air pressure existing on the dirt side; and
the deformation actuator arrangement includes the pneumatic pressure source, the pneumatic pressure source being configured to function as a deformation actuator.

15. The mobile earth working machine of claim 14, wherein:
the extraction device further includes a conveying fan, the filter element being located on an intake side of the conveying fan; and the deformation actuator arrangement includes the conveying fan, the conveying fan being configured to function as another deformation actuator.

16. The mobile earth working machine of claim 13, wherein:
the extraction device further includes a conveying fan, the filter element being located on an intake side of the conveying fan; and
the deformation actuator arrangement includes the conveying fan, the conveying fan being configured to function as a deformation actuator.

17. The mobile earth working machine of claim 1, wherein:
the filter housing includes an outlet configuration displaceable between an open position and a closed position, wherein in the open position the outlet configuration opens an outlet opening in the filter housing configured such that dust particle material accumulated in the filter housing is removable from the filter housing through the outlet opening.

18. The mobile earth working machine of claim 17, further comprising:
a transport conveyor configured to convey substrate material removed by the working apparatus away from the working apparatus to a delivery location; and
wherein the filter housing is arranged above the transport conveyor such that when the outlet configuration is in the open position the outlet opening opens toward the transport conveyor.

19. The mobile earth working machine of claim 1, wherein:
the filter element receptacle comprises a rotary bearing.

20. The mobile earth working machine of claim 1, wherein:
the filter element is detachably coupled to the filter element receptacle by a threaded connection or a bayonet connection.

21. The mobile earth working machine of claim 1, further comprising:
a transport conveyor configured to convey substrate material removed by the working apparatus away from the working apparatus to a delivery location; and
wherein the filter housing is arranged above the transport conveyor;
wherein the filter element includes a filter material having a dirt side and a clean side, the dirt side and the clean side being located upstream and downstream, respectively, in terms of an operational flow direction of the dust-laden air from the at least one extraction location to the discharge location; and
the cleaning apparatus further includes a pneumatic pressure source configured to increase an air pressure on the clean side above an air pressure existing on the dirt side, the pneumatic pressure source including a compressed air tank and a valve arrangement configured to release the pneumatic pulses of compressed air from the compressed air tank, the compressed air tank being located on top of the filter housing.

22. The mobile earth working machine of claim 21, wherein:
the valve arrangement is also located on top of the filter housing.

23. The mobile earth working machine of claim 21, wherein:
the plurality of the rotatable filter elements includes two and only two rotatable filter elements arranged side by side and parallel to each other in the filter housing.

24. The mobile earth working machine of claim 1, wherein:
the filter apparatus includes a plurality of the rotatable filter elements numbering less that ten rotatable filter elements.

25. The mobile earth working machine of claim 24, wherein:
the plurality of the rotatable filter elements includes two and only two rotatable filter elements arranged side by side and parallel to each other in the filter housing.

26. A mobile earth working machine, comprising:
a working apparatus configured to remove material from a region of a substrate;
a transport conveyor configured to convey substrate material removed by the working apparatus away from the working apparatus to a delivery location; and
an extraction device configured to extract dust-laden air generated by the working apparatus from at least one extraction location, and to exhaust extracted air at a discharge location different from the extraction location, the extraction device including a filter apparatus arranged along an operational flow path from the at least one extraction location to the discharge location, the filter apparatus including:
a filter housing including two filter element receptacles, each filter element receptacle being rotatable around a respective rotation axis, the filter housing being located above the transport conveyor;
two filter elements, each filter element being detachably coupled at one longitudinal end of the filter element in a cantilever fashion to a respective one of the filter element receptacles such that the filter elements are rotatable about the respective rotation axes, the filter elements being configured to remove dust particles from the air flowing along the operational flow path through the filter apparatus;
a cleaning apparatus configured to remove from the filter elements dust particles accumulated on the filter elements during filtering operation;
a rotary drive system configured to rotate the filter elements about the respective rotation axes;
wherein the filter housing includes an outlet configuration displaceable between an open position and a closed position, wherein in the open position the outlet configuration opens an outlet opening in the filter housing configured such that dust particle material accumulated in the filter housing is removable from the filter housing through the outlet opening onto the transport conveyor; and
wherein the two filter elements are located above the outlet configuration.

* * * * *